United States Patent [19]

Blount

[11] Patent Number: 5,381,135
[45] Date of Patent: Jan. 10, 1995

[54] VEHICLE DECELERATION ALERTING DEVICE

[75] Inventor: Robert L. Blount, 1833 New Hampshire Ave., NW. Apartment #510, Washington, D.C. 20009

[73] Assignee: Robert L. Blount, Washington, D.C.

[21] Appl. No.: 957,800

[22] Filed: Oct. 8, 1992

[51] Int. Cl.$^6$ ............................ G08B 5/24; B60Q 1/50
[52] U.S. Cl. ................................... 340/487; 340/463; 340/464; 340/467; 340/456
[58] Field of Search ............... 340/463, 467, 464, 487, 340/456

[56] References Cited
U.S. PATENT DOCUMENTS 3,676,844  7/1972  Hendrickson .................. 340/467
3,683,329  8/1972  Sattler ............................ 340/467

Primary Examiner—Donnie L. Crosland
Attorney, Agent, or Firm—Barnes & Thornburg

[57] ABSTRACT

A yellow warning light indicator that is located at the rear of a lead vehicle to be visible by a tailing vehicle and wherein the yellow warning light is lit when the driver of the lead vehicle releases his foot from the accelerator pedal so as to warn the driver of the trailing vehicle that the lead vehicle is slowing down.

4 Claims, 1 Drawing Sheet

VEHICLE DECELERATION ALERTING DEVICE

BACKGROUND AND SUMMARY OF THE INVENTION

The invention relates to a yellow warning light indicator that is located at the rear of a lead vehicle to be visible by a tailing vehicle and wherein the yellow warning light is lit when the driver of the lead vehicle releases his foot from the accelerator pedal so as to warn the driver of the trailing vehicle that the lead vehicle is slowing down.

It is known to provide brake warning lights on vehicles which are energized when the brakes are applied to alert drivers in trailing vehicles to the fact that the vehicle ahead of them is slowing down by virtue of the driver applying the brakes. However, such a red warning signal is only applied when the brakes are applied. Drivers quite often slow down by just releasing the accelerator pedal. Under this condition of vehicle slow down, a driver in a trailing vehicle will have no advanced warning of the release of the accelerator pedal by the driver of a leading vehicle.

It is an object of this invention to warn the driver of a trailing vehicle when a leading vehicle is slowing down.

The invention contemplates providing a yellow coasting warning light adjacent the red braking lights situated at the rear of motor vehicles.

The yellow coasting light can be energized by either a release of the accelerator pedal, or a sudden easing of the accelerator pedal.

While the preferred control would involve both a pedal position and a sudden easing of the accelerator pedal control, only an accelerator pedal release signal could be used.

The invention contemplates that the circuit for the yellow coasting warning lamp would have two switches in series. The first switch being connected to a vehicle transmission or gear shift lever and being opened when the gear shift is in a "park", "reverse", or "neutrals" condition. The second switch would be activated by the accelerator pedal. Thus the vehicle would have to be in a forward gear before the yellow warning light could be activated.

Other objects, advantages and novel features of the present invention will become apparent from the following detailed description of the invention when considered in conjunction with the accompanying drawings.

DETAILED DESCRIPTION OF THE DRAWINGS

Figure 1:
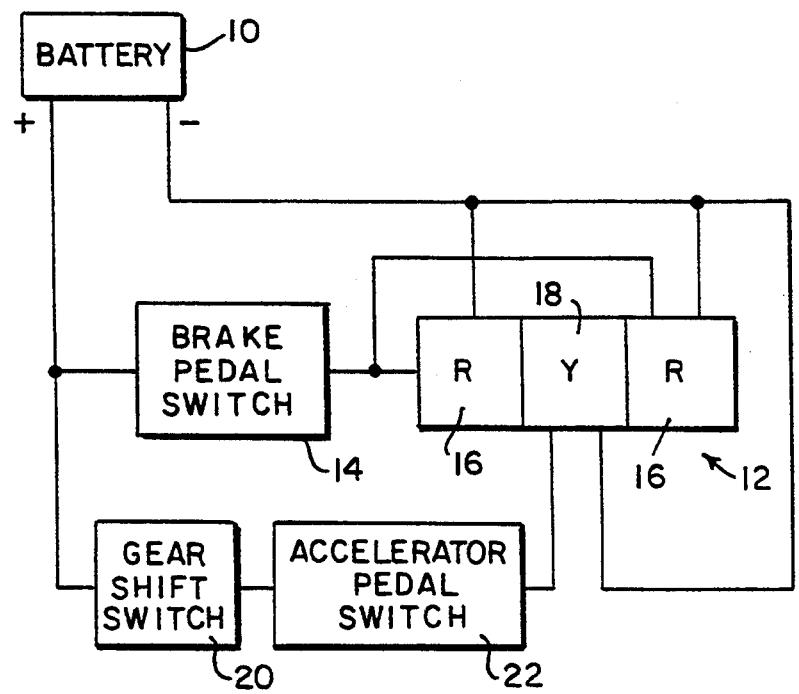
FIG. 1 shows an electrical schematic of the circuitry for the brake and coasting warning light of the invention.

FIG. 1 show a schematic for a brake and coasting warning light assembly 12 normally located in the rear window (not shown) of a motor vehicle (also not shown). A battery 10 has its plus side connected to a brake pedal switch 14 which operates in a conventional manner to close a circuit to energize red brake warning light(s) 16 when a driver applies the vehicle brakes. As shown in FIG. 1 the warning light assembly 12 has two red brake warning lights 16 separated by a yellow coasting warning light 18. The particular three bulb configuration shown is not mandatory as the invention also contemplates one yellow and red bulb side-by-side, or above and below each other. Likewise while the three bulb configuration is shown horizontal, such could be oriented vertically.

FIG. 1 also schematically shows the yellow coasting light 18 circuit wherein the battery 10 is connected to yellow warning light 18 through a gear shift or transmission switch 20 in series with a accelerator pedal switch 22. The gear shift or transmission switch 20 is in an open condition when the vehicle is in "park", "reverse" or "neutral" and is in a closed conducting position when in a "forward gear" or "drive position". In series with the gear shift, transmission switch 20 is an accelerator pedal switch 22. This pedal switch 22 will close the circuit from the gear shift-transmission switch 20 whenever the accelerator pedal 24 (FIG. 2) is released.

Figure 2:
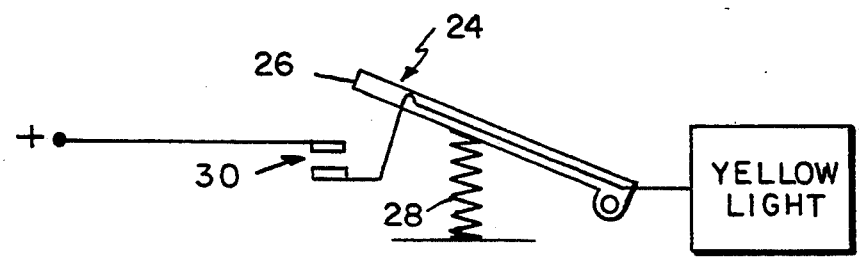
FIG. 2 shows a schematic of an accelerator switch used to activate the yellow warning light.

FIG. 2 shows a schematic for the accelerator pedal 24 release switch wherein the accelerator pedal 26 is biased by a spring 28 to close contacts 30 when the accelerator pedal 6 is released.

Figure 3:
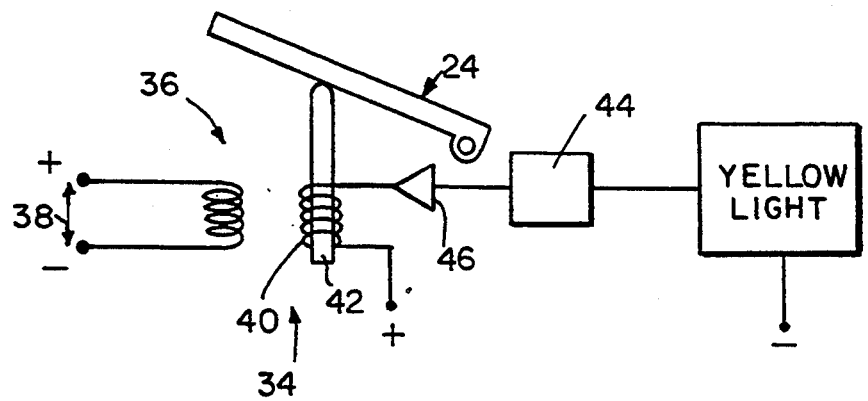
FIG. 3 shows a schematic of a rate of change switch for the accelerator pedal.

FIG. 3 shows a rate of change switch 36 for the accelerator pedal 24 where an inductive coupling with a bias potential 38 is electrically connected to a coil 40. A iron core 42 attached to the accelerator pedal 24. When the accelerator pedal is rapidly moved a voltage is produced in the coil 40 which operates in opposition to that of the bias potential 38 so that when the rate of release exceeds the bias 38, a signal is sent to light the yellow warning light 18. A conventional holding timer circuit 44 keeps the yellow light lit for a period of time after activation by the coil 40. Also shown is a rectifier 46 to allow only passage of a signal in one direction, so acceleration or non-acceleration signals will have no effect on the circuit.

Desirably the acceleration switch 22 of FIG. 1 includes the FIG. 2 configuration, however, the switch 22 of FIG. 1 can comprise the switches of FIG. 2 and FIG. 3 in parallel with each other so that the yellow coasting warning light will be activated either upon a fast deceleration movement of the accelerator pedal 24 by the FIG. 3 circuit on by complete release of the accelerator pedal 24 by the FIG. 2 circuit.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A motor vehicle driving condition warning system comprising:
   A rearwardly facing brake warning light adjacent a rear window of a motor vehicle, wherein the brake light shines red;
   A rearwardly facing engine coasting condition warning light adjacent the brake warning light, wherein the coasting light shines yellow;
   Electrical circuit means for energizing the red brake warning light when the vehicle brakes are applied and for only energizing the yellow coasting warning light when a driver of the vehicle eases off of the accelerator pedal to indicate vehicle deceleration; and wherein the electrical circuit means cannot energize the yellow coasting warning light when the motor vehicle transmission selector shift lever is in reverse/neutral or park.

2. The warning system of claim 1, wherein the red brake light and the yellow coasting light are in one fixture.

3. The warning system of claim 1, wherein the electrical circuit energizes the yellow coasting warning light, when a rate of change of the position of the accelerator pedal exceeds a specified deceleration reference.

4. The warning system of claims 1, wherein the electrical circuit energizes the yellow coasting warning light, when a rate of change of the position of the accelerator pedal exceeds a specified deceleration reference.

* * * * *